United States Patent
Seo et al.

(10) Patent No.: US 9,468,081 B2
(45) Date of Patent: Oct. 11, 2016

(54) HIGH-FREQUENCY WAVE TYPE OF X-RAY GENERATOR

(71) Applicant: DRGEM CORP., Gwangmyeong (KR)

(72) Inventors: Young Min Seo, Seoul (KR); Min Soo Byun, Goyang (KR)

(73) Assignee: DRGEM CORP., Gwangmyeong (KR)

( * ) Notice: Subject to any disclaimer, the term of this patent is extended or adjusted under 35 U.S.C. 154(b) by 0 days.

(21) Appl. No.: 14/677,385

(22) Filed: Apr. 2, 2015

(65) Prior Publication Data

US 2016/0021726 A1 Jan. 21, 2016

(30) Foreign Application Priority Data

Jul. 21, 2014 (KR) .................. 10-2004-0091717

(51) Int. Cl.
*H05G 1/12* (2006.01)
*H05G 1/10* (2006.01)
(Continued)

(52) U.S. Cl.
CPC .............. *H05G 1/12* (2013.01); *G05F 1/455* (2013.01); *G05F 5/00* (2013.01); *H02M 1/081* (2013.01); *H02M 1/088* (2013.01);
(Continued)

(58) Field of Classification Search
CPC ............ H05G 1/00; H05G 1/08; H05G 1/10; H05G 1/12; H05G 1/14; H05G 1/16; H05G 1/18; H05G 1/20; H05G 1/26; H05G 1/30; H05G 1/32; H01J 35/00; H01J 35/02; G05F 1/10; G05F 1/12; G05F 1/40; G05F 1/44; G05F 1/45; G05F 1/455; G05F 1/46; G05F 1/66; G05F 5/00; H04B 1/16; H04B 1/1607; H02M 1/00; H02M 1/0061; H02M 1/08; H02M 1/081; H02M 1/088; H02M 1/096; H02M 1/42; H02M 1/4241; H02M 1/425; H02M 7/00; H02M 7/003; H02M 7/006; H02M 7/42; H02M 7/44; H02M 7/46; H02M 11/00; H02M 2001/0003; H02M 2001/0016; H02M 2001/0022; H02M 2001/0025; H02P 1/16; H02P 1/26; H02P 1/28

See application file for complete search history.

(56) References Cited

U.S. PATENT DOCUMENTS

| 6,738,275 B1 * | 5/2004 | Beland .................. H02M 1/088 363/21.02 |
| 2011/0002446 A1 * | 1/2011 | Beland .................... H05G 1/10 378/111 |

(Continued)

FOREIGN PATENT DOCUMENTS

| JP | 3042777 | 3/2000 |
| KR | 10-2009-0030531 | 3/2009 |

OTHER PUBLICATIONS

KIPO Notice to Submit a Response dated Jan. 8, 2015.

*Primary Examiner* — Anastasia Midkiff
(74) *Attorney, Agent, or Firm* — The PL Law Group, PLLC

(57) ABSTRACT

A high frequency X-ray generator includes an anode voltage generator, a cathode voltage generator and a X-ray tube. The anode voltage generator is configured to generate a first high voltage. The cathode voltage generator is configured to generate a second high voltage having a same waveform as the first high voltage. The second high voltage has a different phase by 180 degrees compared to the first high voltage. The X-ray tube is configured to generate a X-ray by the first high voltage and the second high voltage. The first high voltage is applied through an anode terminal. The second high voltage is applied through a cathode terminal.

15 Claims, 6 Drawing Sheets

(51) Int. Cl.
*H05G 1/32* (2006.01)
*H01J 35/02* (2006.01)
*G05F 5/00* (2006.01)
*H02M 1/08* (2006.01)
*H02P 1/26* (2006.01)
*G05F 1/455* (2006.01)
*H02M 1/088* (2006.01)
*H02M 1/42* (2007.01)
*G05F 1/10* (2006.01)
*H02M 1/00* (2006.01)
*H05G 1/20* (2006.01)

(52) U.S. Cl.
CPC ............ *H02M 1/4241* (2013.01); *H05G 1/10* (2013.01); *H05G 1/32* (2013.01); *G05F 1/10* (2013.01); *H01J 35/02* (2013.01); *H02M 2001/0016* (2013.01); *H02P 1/26* (2013.01); *H05G 1/20* (2013.01)

(56) References Cited

U.S. PATENT DOCUMENTS

2011/0286580 A1* 11/2011 Beland .................. H02M 1/088
378/111
2015/0063525 A1* 3/2015 Katcha .................... A61B 6/03
378/4

* cited by examiner

HIGH-FREQUENCY WAVE TYPE OF X-RAY GENERATOR

This application claims priority under 35 U.S.C. §119 to Korean Patent Application No. 10-2014-0091717, filed on Jul. 21, 2014, the disclosure of which is incorporated by reference herein in its entirety.

BACKGROUND

1. Field

Example embodiments of the inventive concept relate to a high frequency X-ray generator. More particularly, example embodiments of the inventive concept relate to a "high frequency X-ray generator capable of improving quality of X-ray image using a multiple switching circuit."

2. Description of the Related Art

Generally, an X-ray generator for medical and industrial purpose is a device which generates an X-ray having predetermined quality and dose through an X-ray tube.

A traditional X-ray generator may a perform switching operation at a rate of more than 15 kHz at a high frequency inverter, and provide the generated voltage to a transformer and a rectifier circuit to multiply and rectify. The transformer multiplies the provided voltage according to a turns ratio of a first side and a second side. The rectifier circuit performs a rectifying of an AC voltage from the transformer. The traditional X-ray generator generates a high voltage to apply the X-ray tube according to the above steps.

The traditional X-ray generator may be classified into an X-ray generator with quasi-resonant converter type and an X-ray generator with full resonant converter type.

The X-ray generator with quasi-resonant converter type has a circuit structure that power is applied to both of anode and cathode. In the X-ray generator with quasi-resonant converter type, one inverter and one transformer generates anode high voltage and cathode high voltage, and the sum of the anode high voltage and the cathode high voltage is feedback controlled. However, for this reason, a voltage deviation due to characteristic differences between an anode high voltage circuit and a cathode high voltage circuit may be caused. The voltage deviation is small when the high voltage is low power, whereas the voltage deviation is about 10% when the high voltage is high power.

The X-ray generator with full resonant converter type uses PFM (Pulse Frequency Modulation) method that X-ray output is controlled by modulating switching frequency with maintaining a uniform on-period. An X-ray image is influenced by AC pulsation and rise time which are output voltage characteristics of the X-ray generator. The output voltage characteristics are determined by a tube-voltage output-frequency and dynamics of a controller. As the tube-voltage output-frequency is getting higher, the AC pulsation and the rise time is getting lower, so that clear X-ray image may be obtained. Thus, the X-ray generator with full resonant converter type which can heighten the switching frequency is preferred. However, in the X-ray generator with full resonant converter type, the switching frequency is heightened when low power X-ray is outputted, and the switching frequency is lowered when high power X-ray is outputted to control the X-ray output. Thus, the maximum switching frequency may be heightened, but relationship between the switching frequency and the output voltage or relationship between the switching frequency and the output power is nonlinear, so that responsiveness may be worse than the PWM (Pulse Width Modulation) method.

SUMMARY

One or more example embodiment of the inventive concept provides an X-ray generator capable of improving tube-voltage dynamics, on which X-ray image quality is depend, by a multiple switching circuit comprising a plurality of resonant inverters when a tube-voltage is generated.

One or more example embodiments of the inventive concept also provide a high frequency X-ray generator capable of maintaining fast response of controller which affects accuracy, reproducibility and linearity of the tube-voltage which are main evaluation indexes.

According to an example embodiment of the inventive concept, a high frequency X-ray generator includes an anode voltage generator, a cathode voltage generator and an X-ray tube. The anode voltage generator is configured to generate a first high voltage. The cathode voltage generator is configured to generate a second high voltage having a same waveform as the first high voltage. The second high voltage has a different phase by 180 degrees compared to the first high voltage. The X-ray tube is configured to generate an X-ray by the first high voltage and the second high voltage. The first high voltage is applied through an anode terminal. The second high voltage is applied through a cathode terminal. Each of the anode voltage generator and the cathode voltage generator includes a voltage generator, a high voltage tank and a feedback controller. The voltage generator is configured to generate a voltage through a multiple switching circuit. The voltage has an AC type and a predetermined frequency. The multiple switching circuit includes a plurality of resonant inverters. The high voltage tank is configured to generate a first high voltage for the anode voltage generator or to generate a second high voltage for the cathode voltage generator by multiplying and rectifying the voltage. The feedback controller is configured to perform a feedback operation by controlling the multiple switching circuit of the anode voltage generator or of the cathode voltage generator based on the first or second high voltage which is applied thereto. Each of the resonant inverters is driven at a phase which is different from the phase at which each of the other inverters are driven. The anode voltage generator and the cathode voltage generator may be physically separate voltage generators.

In an example embodiment, each of the resonant inverters of the multiple switching circuit may be connected to each other in parallel with respect to an input voltage.

In an example embodiment, the number of the resonant inverters of the anode voltage generator may be substantially the same as the number of the resonant inverters of the cathode voltage generator.

In an example embodiment, the high voltage tank may include a plurality of high-voltage transformers and a high-voltage rectifier circuit. The high-voltage transformer may be connected to the multiple switching circuit in series, and multiply received voltage. The high-voltage rectifier circuit may generate the first high voltage or the second high voltage by rectifying the voltage that has been multiplied by the high-voltage transformers.

In an example embodiment, each one of the high-voltage transformers may include a core. The core may have a first side and a second side. One first winding may be wound at the first side. A plurality of second windings may be wound at the second side. Each of the high-voltage transformers may be connected to the high-voltage rectifier circuit in a series. The first winding may receive the voltage from each of the resonant inverters of the multiple switching circuit. The second winding may multiply the received voltage the first winding received as the number of the second windings.

In an example embodiment, the anode voltage generator or the cathode voltage generator may further include a resonant circuit configured to transmit the voltage generated from the voltage generator to the high voltage tank.

In an example embodiment, the high-voltage rectifier circuit may be connected to a plurality of the second sides of the high-voltage transformers in series, and generate the first high voltage or the second high voltage by summing a plurality of the multiplied voltages from the high-voltage transformers.

In an example embodiment, the feedback controller may include the first high voltage to a reference voltage when the feedback controller is included in the anode voltage generator. The feedback controller may compare the second high voltage to the reference voltage when the feedback controller is included in the cathode voltage generator. Thus, the feedback controller may control the multiple switching circuit configured to modulate pulse width of the voltage, which is generated from the voltage generator of the anode voltage generator or the cathode voltage generator, based on compared value.

In an example embodiment, the feedback controller may include a PI controller and a PWM controller. The PI controller may calculate a difference value between the reference voltage and the first or second high voltage, and generates a control value based on the difference value. The PWM controller may control the multiple switching circuit configured to modulate the pulse width of the voltage based on the control value.

In an example embodiment, the first and second high voltage tanks may be disposed in a parallel-connected-type or serial-connected-type according to an arrangement of high-voltage transformers of each of the first and second high voltage tanks.

In an example embodiment, the high frequency X-ray generator may further include an insulator configured to insulate a first high-voltage cable connecting a terminal from the first high voltage tank and configured to insulate a second high-voltage cable connecting a terminal from the second high voltage tank. The first high-voltage cable connecting the terminal may transmit the first high voltage. The second high-voltage cable connecting the terminal may transmit the second high voltage.

In an example embodiment, when the first and second high voltage tanks are disposed in the parallel-connected-type configuration, cores of the high-voltage transformers of the first high voltage tanks and cores of the high-voltage transformers of the second high voltage tank may be disposed in a same direction to each other, and arranged in a perpendicular direction to the direction of the core. The insulator may be further configured to insulate the first high voltage tank from the second high voltage tank.

In an example embodiment, the insulator may have a T-shape.

In an example embodiment, when the first and second high voltage tanks are disposed in the serial-connected-type configuration, cores of the high-voltage transformers in the first high voltage tank and cores of the high-voltage transformers of the second high voltage tank may be disposed in a same direction to each other. The high-voltage transformer of the first high voltage tank and the high-voltage transformer of the second high voltage tank may be disposed in a mirror symmetric configuration. Each of the high-voltage transformers in each of the high voltage tanks may be disposed in a multi-layer structure, so that all of directions of second windings of the high-voltage transformers in each of the high voltage tanks may be same each other. A ground terminal may be disposed between the first high voltage tank and the second high voltage tank.

In an example embodiment, the insulator may have a I-shape to insulate the high-voltage cable connecting terminal and the high voltage tank.

According to the example embodiments of the present inventive concept, the high frequency X-ray generator may generate the tube-voltage having high pulsation frequency through the multiple switching circuit. As the pulsation frequency of tube-voltage is getting increased, rise time of the tube-voltage and magnitude of pulsation voltage is getting decreased, so that quality of X-ray image may be improved.

In addition, the high frequency X-ray generator according to the present example embodiment, the tube-voltage may be controlled by PWM method, so that accuracy, reproducibility and linearity of the tube-voltage which are main evaluation indexes may be improved comparing to an X-ray generator with full resonant converter type.

BRIEF DESCRIPTION OF THE DRAWINGS

The above and other features of the inventive concept will become more apparent by describing in detail example embodiments thereof with reference to the accompanying drawings, in which.

DETAILED DESCRIPTION

Hereinafter, the inventive concept will be explained in detail with reference to the accompanying drawings. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. Like numerals refer to like elements throughout.

Figure 1:
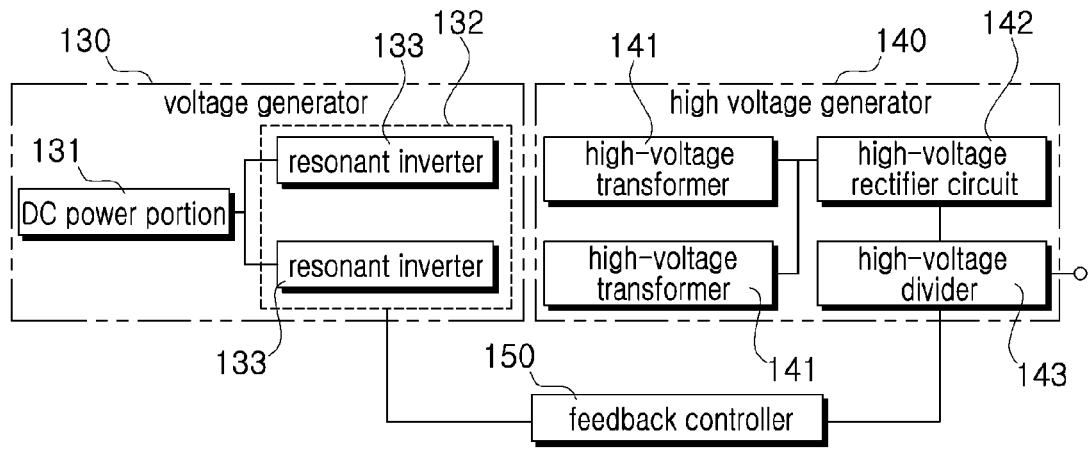
FIG. 1 is a structural block diagram illustrating a high frequency X-ray generator according to an example embodiment of the inventive concept.

FIG. 1 is a structural block diagram illustrating a high frequency X-ray generator according to an example embodiment of the inventive concept. Referring to FIG. 1, a high frequency X-ray generator 100 includes an anode voltage generator 110, a cathode voltage generator 120 and an X-ray tube 160.

The anode voltage generator 110 generates an anode voltage which is applied to an anode terminal of the X-ray tube 160. The anode voltage generator 110 includes a first voltage generator 130a, a first high voltage tank 140a, and a first feedback controller 150a.

The first voltage generator 130a generates a first voltage using a DC input voltage. The first voltage is an AC voltage having a predetermined frequency. The first high voltage tank 140a may generate a first high voltage by multiplying and rectifying the first voltage. At this time, the first high voltage is applied to the anode terminal of the X-ray tube 160, so that the first high voltage may also be a tube-voltage which is applied to the anode terminal. The first feedback controller 150a calculates error between a reference voltage and the distributed first high voltage, and may control the first voltage generator 130a, so that the first voltage may maintain the predetermined frequency.

The cathode voltage generator 120 generates a cathode voltage which is applied to a cathode terminal of the X-ray tube 160. The cathode voltage generator 120 includes a second voltage generator 130b, a second high voltage tank 140b, and a second feedback controller 150b.

A second high voltage is substantially same waveform (for example, same frequency and amplitude) as the first high voltage, but has a different phase by 180 degrees. The second high voltage may be a tube-voltage applied to the cathode terminal of the X-ray tube 160. Thus, the second voltage generator 130b, the second high voltage tank 140b, and the second feedback controller 150b of the cathode voltage generator 120 may have substantially same function and structure as the first voltage generator 130a, the first high voltage tank 140a and the first feedback controller 150a of the anode voltage generator 110. However, relationship between an output terminal and a ground terminal of the second high voltage tank 140b is different from that of the first high voltage tank 140a, so that a second high voltage which has delayed phase by 180 degrees compared to the first high voltage may be generated.

The first high voltage and the second high voltage are applied to the anode terminal and the cathode terminal of the X-ray tube 160, respectively. At this time, a current flows through a cathode filament disposed at the cathode terminal, and the cathode filament is heated, so that thermal electron is generated. And then, the thermal electron is accelerated by a voltage difference between the first and second voltages which is generated between the anode and the cathode, so that the thermal electron clashes with the anode. Thus, X-ray may be generated by converting kinetic energy of the thermal electron into the X-ray and thermal energy.

In addition, in an X-ray generator with quasi-resonant converter type, pulsation frequency of tube-voltage is limited by a switching characteristic of transistor which is used at an inverter of a voltage generator. At this time, the maximum switching frequency of the transistor is determined by a driving performance of a transistor driving circuit and an internal loss of the transistor. In a case of IGBT (Insulated Gate Bipolar Transistor) and MOSFET (Metal-Oxide-Semiconductor Field-Effect Transistor), maximum switching frequency is about 20 kHz and 50 kHz, respectively. As the pulsation frequency of tube-voltage is getting increased, rise time of the tube-voltage and magnitude of pulsation voltage is getting decreased, so that quality of X-ray image may be improved. Thus, to improve the quality of X-ray image, the high frequency X-ray generator according to the present example embodiment may include a multiple switching circuit in the voltage generator to increase the pulsation frequency of tube-voltage.

Figure 2:
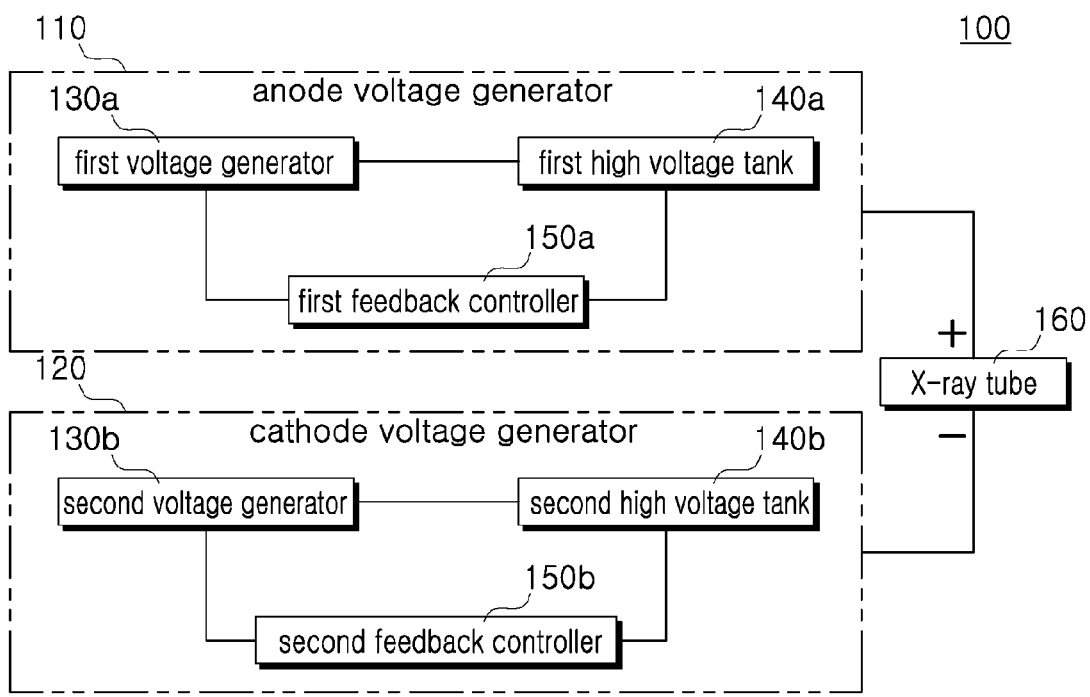
FIG. 2 is a structural block diagram illustrating a circuit of an anode voltage generator or a cathode voltage generator of a high frequency X-ray generator according to an example embodiment of the inventive concept.
Figure 3:
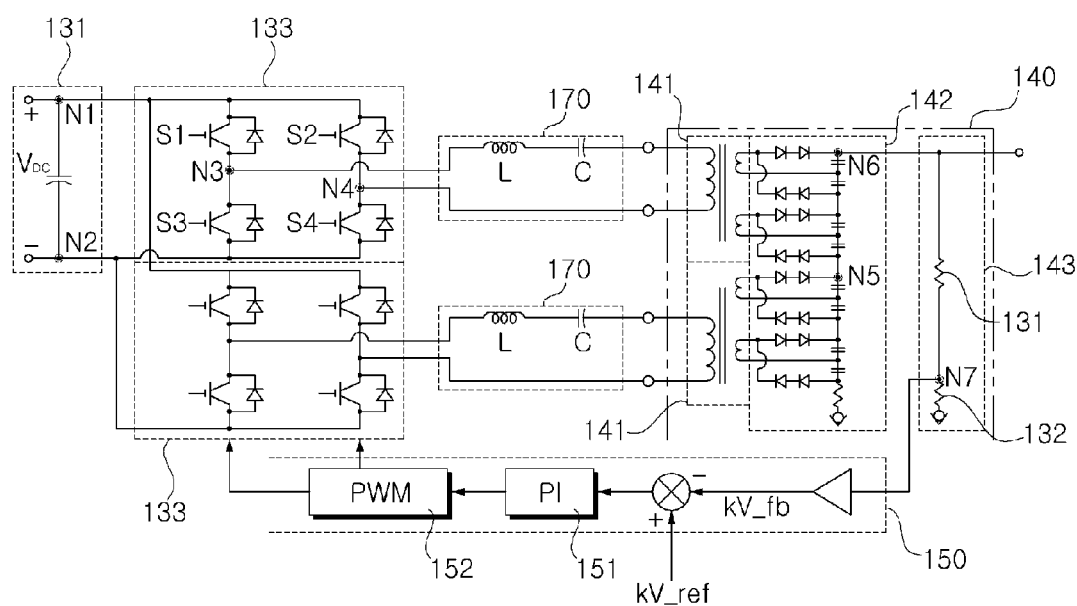
FIG. 3 is a circuit diagram illustrating the anode voltage generator or the cathode voltage generator of FIG. 2.

FIG. 2 is a structural block diagram illustrating a circuit of an anode voltage generator or a cathode voltage generator of a high frequency X-ray generator according to an example embodiment of the inventive concept. FIG. 3 is a circuit diagram illustrating the anode voltage generator or the cathode voltage generator of FIG. 2. Referring to FIGS. 2 and 3, first and second voltage generator 130a and 130b, first and second high voltage tank 140a and 140b, and first and second feedback controller 150a and 150b are explained in detail. Note that, in the FIG. 2, although words such as "first" or "second" are omitted, internal components of the anode voltage generator 110 and those of the cathode voltage generator 120 are substantially same. Thus, voltage generator 130 means first or second voltage generator 130a or 130b, high voltage tank 140 means first or second high voltage tank 140a or 140b, and feedback controller 150 means first or second feedback controller 150a or 150b.

Referring to FIG. 2, the voltage generator 130 includes a DC power portion 131, and a multiple switching circuit 132. The multiple switching circuit 132 may include a plurality of resonant inverters 133. The DC power portion 131 is electrically connected to each of the resonant inverters 133 in series, so that input voltage is applied to each of the resonant inverters 133. Although only two resonant inverters 133 are described in the figure, the multiple switching circuit 132 may include more than two resonant inverters 133. Each of the resonant inverters 133 may be electrically connected to each other in parallel. In addition, the number of the resonant inverters 133 in the first voltage generator 130a and the number of the resonant inverters 133 in the second voltage generator 130b may be same.

More specifically, referring to FIG. 3, a capacitor is formed between N1 node and N2 node, so that an input voltage VDC having DC characteristics is formed. Although not shown in FIG. 3, the DC power portion 131 may form the input voltage VDC through a capacitor and an AC voltage portion being electrically connected to the capacitor in parallel.

Each of the resonant inverters 133 of the multiple switching circuit 132 is electrically connected to the N1 node and the N2 node, and may include a plurality of switching element. Although one resonant inverter 133 includes four switching elements S1 to S4 in the FIG. 3, this is one of the example embodiments, and the resonant inverters 133 may include the different number of switching elements. Each of the switching elements S1 to S4 includes a transistor and a diode being reverse connected to the transistor. The transistor may be one of IGBT and MOSFET.

Hereinafter one resonant inverter 133 will be explained in detail. A first switching element S1 and a third switching element S3 may be connected in series, and N3 node may be disposed between the first switching element S1 and the third switching element S3. A second switching element S2 and a fourth switching element S4 may be connected in series, and N4 node may be disposed between the second switching element S2 and the fourth switching element S4. The third switching element S3 and the fourth switching element S4 may be connected to N2 node. Each of the switching element S1 to S4 may be set with different on-off timing according to PWM (Pulse Width Modulation) type control, so that a voltage, to which a predetermined frequency is added from the DC input voltage, may be generated. PWM is a method of modulating a pulse-width. In the PWM, equivalent voltage may be changed by changing output time of voltage on a pulse without changing level of flatted DC voltage.

Each of the resonant inverters 133 is driven with phase difference. The pulsation frequency of total output voltage is increased in proportion to the number of inverters. Ripple voltage is decreased in inverse proportion to the number of inverters. For example, When the multiple switching circuit 132 includes N resonant inverters 133, capacity of each invertors is 1/N of total capacity, output voltage of each of resonant inverters 133 is 1/N of total voltage, and output capacity of each invertors is 1/N, because the output current is all same.

In addition, referring to FIG. 3, voltage generated at the resonant inverter 133 may be transmitted to the high voltage tank 140 through a resonant circuit 170. The resonant circuit 170 may be a series resonant circuit. As frequency of voltage which is applied to an input terminal of the resonant circuit 170 is getting closer to a resonant frequency of an inductor L and a capacitor C of the resonant circuit 170, the voltage applied to the input terminal may be transmitted to an output terminal, which is an input terminal of the high voltage tank 140, almost without loss.

The high voltage tank 140 includes a plurality of high-voltage transformers 141, a high-voltage rectifier circuit 142 and a high-voltage divider 143. Although the number of the high-voltage transformers 141 is two in FIGS. 2 and 3, this is just one example embodiment. The high voltage tank 140 may include more than two high-voltage transformers 141.

One high-voltage transformers 141 is corresponding to one resonant inverter 133, and receives the voltage generated at the resonant inverter 133 through the resonant circuit 170. The high-voltage transformer 141 includes a core, a first winding and a second winding. A first side of the core performs an input terminal to which a voltage is applied, and one first winding may be wound at the first side. A plurality of second winding may be wound at a second side of the core. Voltage at the first side may be multiplied according to turn ratio of the second winding and the first winding. Although two second winding is wound in the FIG. 3, a different number of second winding may be wound.

The high-voltage rectifier circuit 142 may rectify the multiplied voltage which is applied thereto through the second side of the high-voltage transformers 141. In addition, the high-voltage rectifier circuit 142 may be connected to each of the plurality of the high-voltage transformers 141 in series, so that high voltage may be generated by summing each of the multiplied voltage from each of the high-voltage transformers 141. For example, referring to FIG. 3, the multiplied voltage from lower high-voltage transformer 141 may be applied to N5 node, and the multiplied voltage from upper high-voltage transformer 141 may be applied between N5 node and N6 node, the high-voltage rectifier circuit 142 may generate the high voltage by summing the multiplied voltages from the lower and upper high-voltage transformers 141.

The high-voltage divider 143 includes a plurality of resistances, and divides the high voltage. The high voltage is divided and applied to the resistances according to size of the resistances. One of them may be transmitted to a feedback controller 150, which will be mentioned later, and may be used to control a voltage generated from the multiple switching circuit 132. For example, referring to FIG. 3, the high-voltage divider may be consist of R1 resistance and R2 resistance, and the divided high-voltage at the R2 resistance which is a voltage applied to N7 node, may be transmitted to the feedback controller 150.

The feedback controller 150 receives the divided high-voltage, which will be mentioned as feedback voltage, and calculates a control value by an error with reference voltage. Thus, the voltage generated from the multiple switching circuit 132 may be feedback controlled. The feedback controller 150 may include PI controller 151 and PWM controller 152 to perform this.

As a proportional-integral controller, the PI controller 151 may receive a different value of the reference voltage (kV_ref) and the feedback voltage (kV_fb) through an operator. The PI controller 151 may generate the control value based on an element formed by applying proportional factor to the different value, and an element formed by applying integral factor to a value which is integral value of the different value.

The PWM controller 152 may control switching operations of the resonant invertor of the multiple switching circuit 132 based on the control value, so that magnitude of the voltage may be controlled. Thus, the voltage may be controlled by modulating a pulse width of the voltage.

The high frequency X-ray generator according to the present example embodiment, the voltage generated through the multiple switching circuit 132 of the voltage generator 130 may be controlled by PWM method, so that accuracy, reproducibility and linearity of the tube-voltage which are main evaluation indexes may be improved comparing to an X-ray generator with full resonant converter type.

Figure 4:
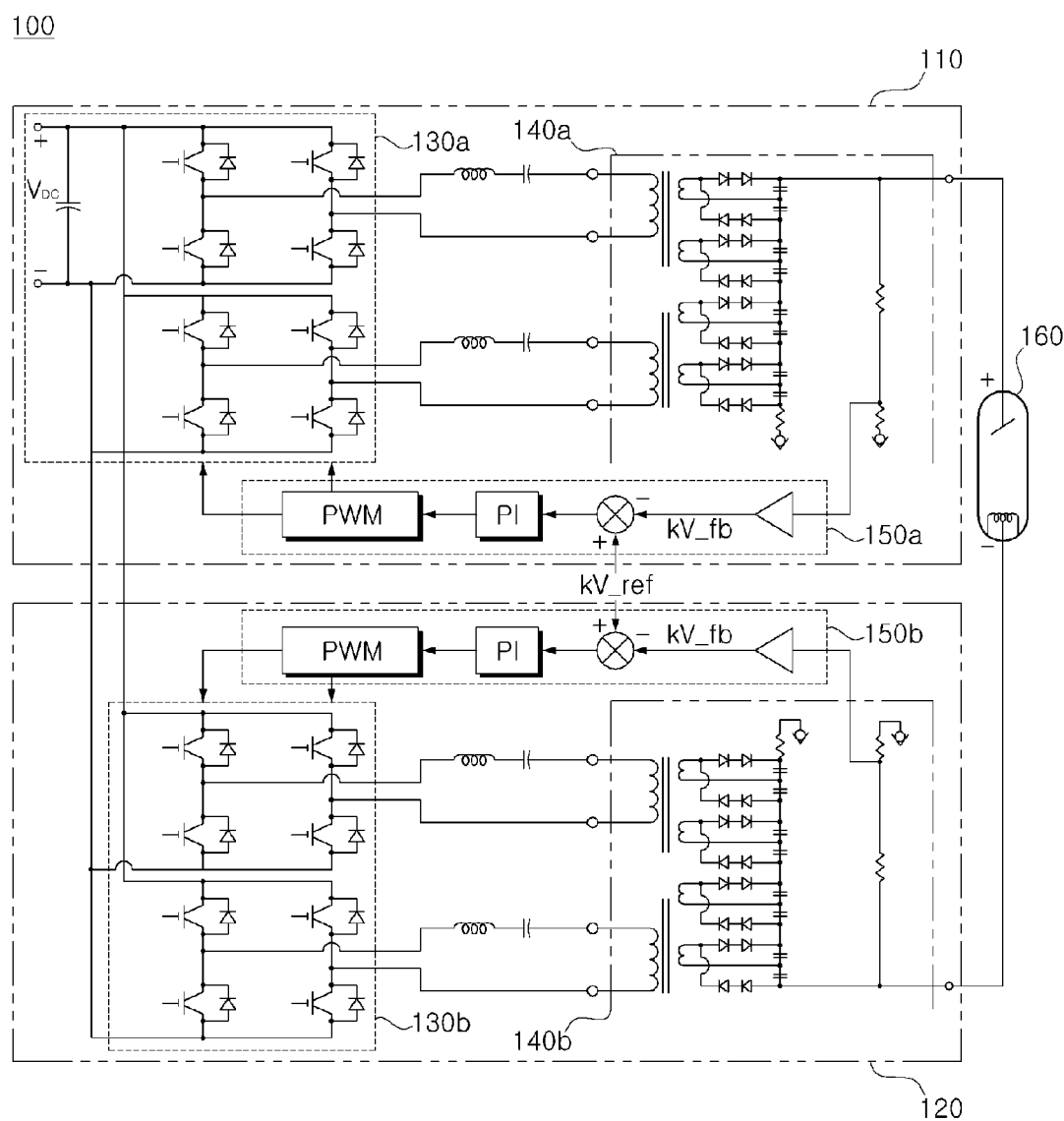
FIG. 4 is a circuit diagram illustrating the high frequency X-ray generator of FIG. 1.
Figure 5A:
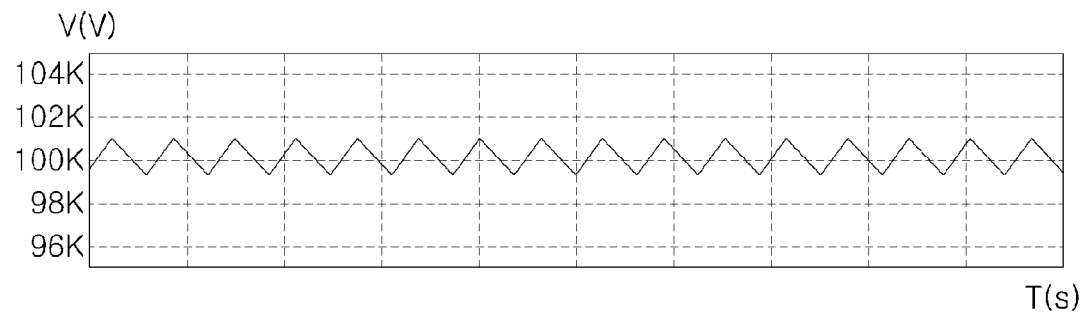
FIG. 5A is a waveform diagram illustrating output voltage of a high frequency X-ray generator according to an example embodiment of the inventive concept.
Figure 5B:
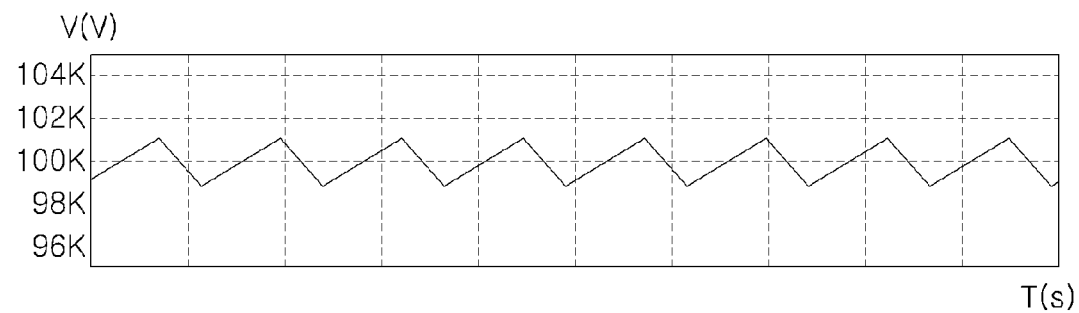
FIG. 5B is a waveform diagram illustrating output voltage of traditional X-ray generator.

FIG. 4 is a circuit diagram illustrating the high frequency X-ray generator of FIG. 1. FIG. 5A is a waveform diagram illustrating output voltage of a high frequency X-ray generator according to an example embodiment of the inventive concept. FIG. 5B is a waveform diagram illustrating output voltage of traditional X-ray generator. Referring to FIG. 4, a high frequency X-ray generator 100 includes an anode voltage generator 110, a cathode voltage generator 120 and an X-ray tube 160.

Although internal components of the anode voltage generator 110 and the cathode voltage generator 120 may be substantially same as that described in FIG. 3, the anode voltage generator 110 and the cathode voltage generator 120 may generate high voltages, which are different each other, according to relationship between output terminal and ground terminal of the high voltage tank 140, the anode voltage generator 110.

In addition, the multiple switching circuit 132 included in each of the voltage generators 110 and 120 may have same number of resonant inverters 133 due to same design of the anode voltage generator 110 and the cathode voltage generator 120. For example, when a circuit of the high frequency X-ray generator 100 includes N resonant inverters 133, each of the multiple switching circuit 132 of the anode voltage generator 110 and the multiple switching circuit 132 of the cathode voltage generator 120 include N/2 resonant inverters 133. Here, there is no voltage deviation due to different characteristics of the anode voltage generator 110 and the cathode voltage generator 120, and anode high voltage and cathode high voltage may be controlled to different values, so that unipolar output can also be possible. In addition, the anode voltage generator 110 and the cathode voltage generator 120 include feedback controllers 150a and 150b configured to control the multiple switching circuit 132, respectively. PWM signal which is outputted from each of the feedback controllers 150a and 150b may have phase difference of 180/N degrees.

FIG. 5A is a waveform diagram illustrating output voltage of a high frequency X-ray generator according to an example embodiment of the inventive concept. Comparing to output waveform of FIG. 5A and output waveform of FIG. 5B which is formed by a prior art, magnitude of the output voltages are similar to each other, frequency of the output waveform of FIG. 5A is much higher than that of FIG. 5B. Thus, the high frequency X-ray generator according to an example embodiment may generate tube-voltage having higher pulsation frequency through the multiple switching circuit 132. Accordingly, quality of X-ray image may be improved.

Referring to FIGS. 6A to 7B, a structure of the high voltage tank 140 of the high frequency X-ray generator according to an example embodiment will be described in detail. The structure of the high voltage tank 140 relates to arrangement of the first high voltage tank 140a of the anode voltage generator 110 and the second high voltage tank 140b of the cathode voltage generator 120. The first high voltage tank 140a includes a first high-voltage transformer 141a and a first high-voltage rectifier circuit 142a. The second high voltage tank 140b includes a second high-voltage transformer 141b and a second high-voltage rectifier circuit 142b.

Figure 6A:
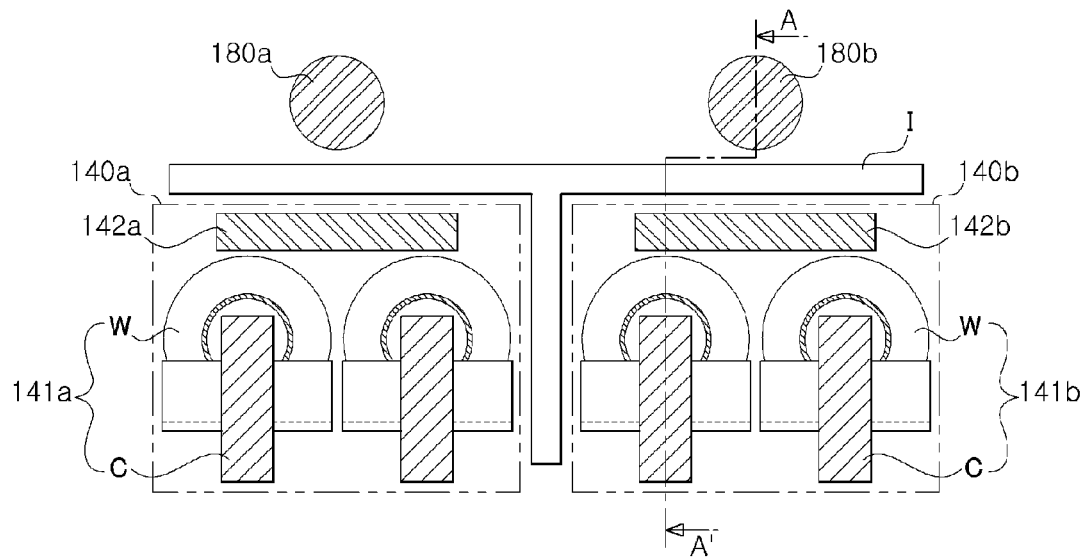
FIG. 6A is a plan view of a parallel-connected-type high voltage tank of a high frequency X-ray generator according to an example embodiment of the inventive concept.
Figure 6B:
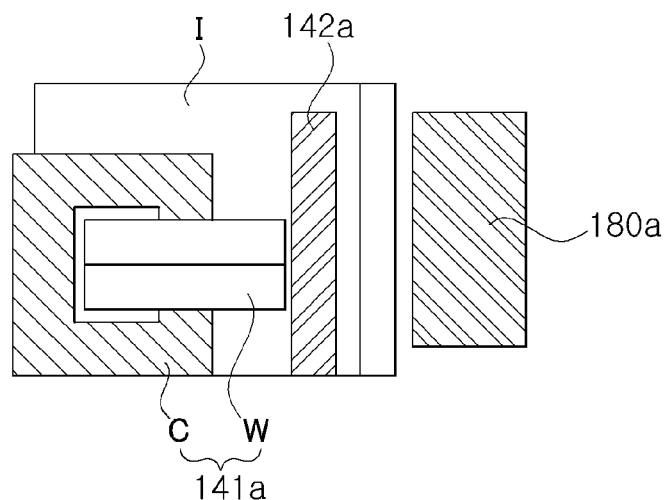
FIG. 6B is a cross-sectional view taken along A-A' of FIG. 6A.

FIG. 6A is a plan view of a parallel-connected-type high voltage tank of a high frequency X-ray generator according to an example embodiment of the inventive concept. FIG. 6B is a cross-sectional view taken along A-A' of FIG. 6A.

Referring to FIG. 6A, the high voltage tank 140 of parallel-connected-type may be explained with dividing placement area of the first high voltage tank 140a and placement area of the second high voltage tank 140b. The first and second high-voltage transformers may be disposed in parallel with each other in each of placement areas. Usually, same kind of the high-voltage transformers 141a or 141b may be placed in parallel.

More specifically, cores c of the first and second high-voltage transformers 141a and 141b may be disposed side by side, so that placement directions of the high-voltage transformers may be same each other. More specifically, a long side of the core c may be disposed downward, and each of the high-voltage transformers 141a and 141b may be disposed adjacent to each other.

Referring to FIG. 6b, the first high-voltage rectifier circuit 142a may be disposed facing a second winding w of the first high-voltage transformers 141a, and the second high-voltage rectifier circuit 142b may be disposed facing a second winding w of the second high-voltage transformers 141a.

In addition, high-voltage cable connecting terminal 180a and 180b to transmit the high voltage generated from the high-voltage rectifier circuit 142 may be disposed space apart from and facing each of the high-voltage rectifier circuits 142a and 142b.

In addition, an insulator I may be disposed between each of the high-voltage rectifier circuits 142a and 142b and the high-voltage cable connecting terminal 180a and 180b.

In addition, when the first high voltage tank 140a and the second high voltage tank 140b are disposed in parallel, if an anode high voltage is +75 kV and a cathode high voltage is −75 kV for example, then 180 kV of insulation, which is 120% of 150 kV that is difference of the anode high voltage and the cathode high voltage, between the first high voltage tank 140a and the second high voltage tank 140b should be guaranteed. Thus, there is also needs to insulate an area between the first high voltage tank 140a and the second high voltage tank 140b, so that the insulator I may have T-shape shown in FIG. 6A. Thus, for a parallel-connected-type the high voltage tank 140, T-shaped insulator I should be used, so that insulation design is complicated.

Figure 7A:
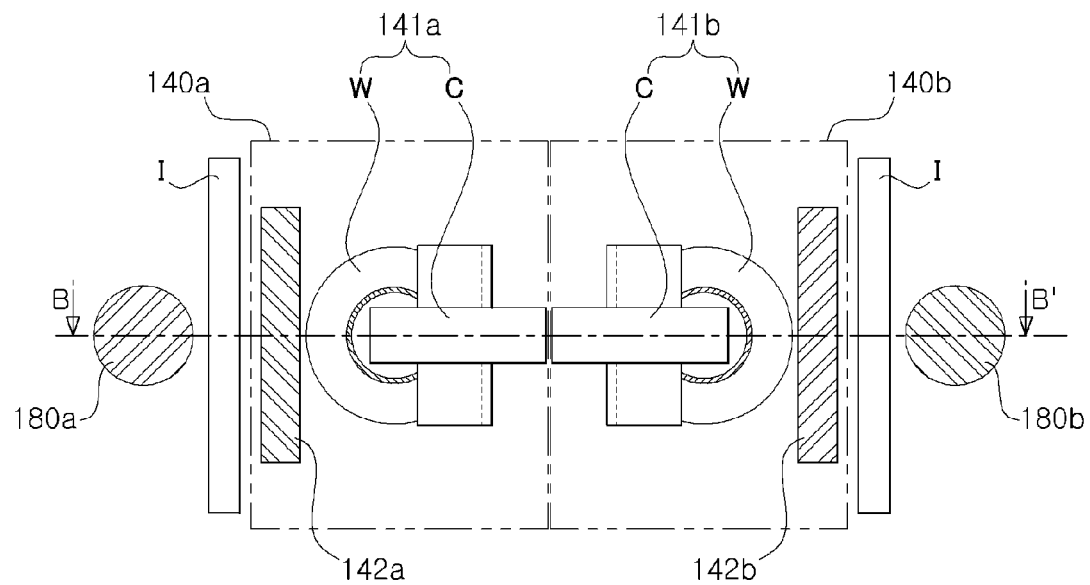
FIG. 7A is a plan view of a serial-connected-type high voltage tank of a high frequency X-ray generator according to an example embodiment of the inventive concept.
Figure 7B:
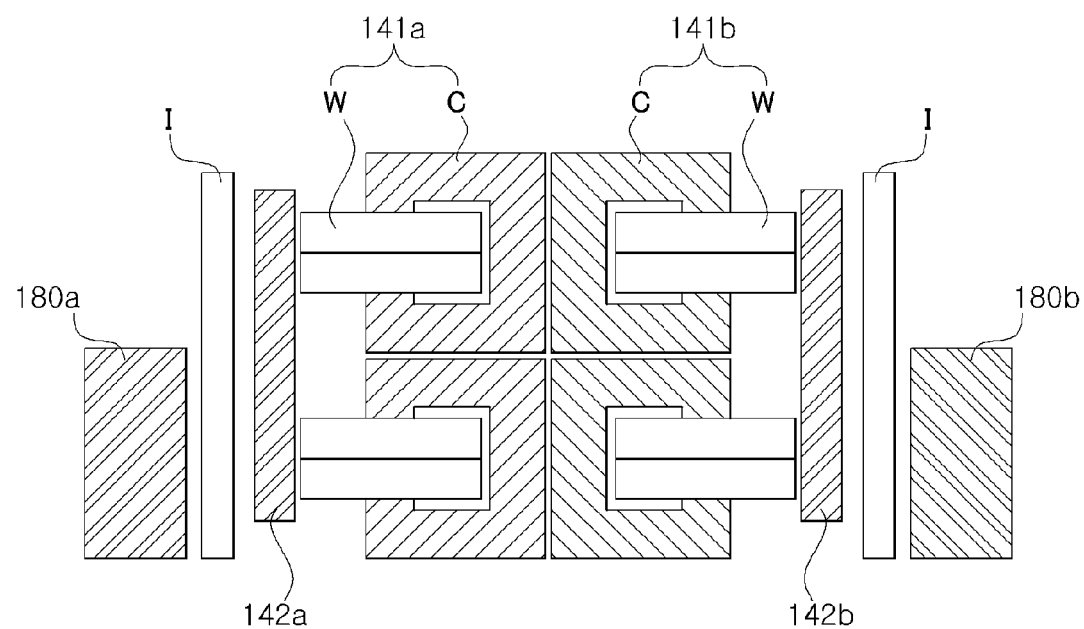
FIG. 7B is a cross-sectional view taken along B-B' of FIG. 7A.

FIG. 7A is a plan view of a serial-connected-type high voltage tank of a high frequency X-ray generator according to an example embodiment of the inventive concept. FIG. 7B is a cross-sectional view taken along B-B' of FIG. 7A.

Referring to FIG. 7A, serial-connected-type the high voltage tank 140 may be explained with dividing placement area of the first high voltage tank 140a and placement area of the second high voltage tank 140b. Here, cores c of the first and second high-voltage transformers 141a and 141b may be disposed to face each other, so that the first high voltage tank 140a and the second high voltage tank 140b are disposed in series. Although not shown in figures, the cores c may be disposed facing each other and in a staggered arrangement, so that the cores c may not disposed in a same extension line. A plurality of the first or second high-voltage transformer 141a or 141b in each of the high voltage tanks 140a and 140b may be disposed in a series. Thus, referring to FIG. 7B, same kind of high-voltage transformer 141a or 141b may be disposed in a multi-layer structure, so that direction of the second winding w in each of the high voltage tanks may be same.

In this case, a ground terminal is disposed between the first high voltage tank 140a and the second high voltage tank 140b, so that area between the first high voltage tank 140a and the second high voltage tank 140b has same electric potential. Thus, the insulator I may not be required. Thus, only one high voltage, for example 75 kV, exists between each of the high-voltage rectifier circuits 142a and 142b which faces each of the second winding w of the high voltage tank 140 and the high-voltage cable connecting terminal 180a and 180b. Thus, the insulator I, which is disposed between each of the high-voltage rectifier circuits 142a and 142b and the high-voltage cable connecting terminal 180a and 180b, has to insulate 120% of only one high voltage, for example 90 kV which is 120% of 75 kV, so that the insulator I may be formed having I-shape.

Therefore, the serial-connected-type high voltage tank has simpler insulating structure than the parallel-connected-type high voltage tank. Thus, the serial-connected-type high voltage tank has an advantage in accessible design or cost cutting.

The foregoing is illustrative of the inventive concept and is not to be construed as limiting thereof. Although a few example embodiments of the inventive concept have been described, those skilled in the art will readily appreciate that many modifications are possible in the example embodiments without materially departing from the novel teachings and advantages of the inventive concept. Accordingly, all such modifications are intended to be included within the scope of the inventive concept as defined in the claims. In the claims, means-plus-function clauses are intended to cover the structures described herein as performing the recited function and not only structural equivalents but also equivalent structures. Therefore, it is to be understood that the foregoing is illustrative of the inventive concept and is not to be construed as limited to the specific example embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. A high frequency X-ray generator comprising:
an anode voltage generator configured to generate a first high voltage;
a cathode voltage generator configured to generate a second high voltage having a same waveform as the first high voltage, the second high voltage having a different phase by 180 degrees compared to the first high voltage; and
an X-ray tube configured to generate an X-ray by the first high voltage which is applied through an anode terminal and the second high voltage which is applied through a cathode terminal, and
wherein each of the anode voltage generator and the cathode voltage generator comprises:
a voltage generator configured to generate a voltage through a multiple switching circuit, the voltage having an AC type and a predetermined frequency, the multiple switching circuit comprising a plurality of resonant inverters;
a high voltage tank configured to generate a first high voltage for the anode voltage generator or to generate a second high voltage for the cathode voltage generator by multiplying and rectifying the voltage; and
a feedback controller configured to perform a feedback operation by controlling the multiple switching circuit of the anode voltage generator or of the cathode voltage generator based on the first or second high voltage which is applied thereto;
wherein each of the resonant inverters is driven at a phase which is different from the phase at which each of the other inverters are driven; and
wherein the anode voltage generator and the cathode voltage generator are physically separate voltage generators.

2. The high frequency X-ray generator of claim 1, wherein each of the resonant inverters of the multiple switching circuit is connected to each other in parallel with respect to an input voltage.

3. The high frequency X-ray generator of claim 1, wherein the number of the resonant inverters of the anode voltage generator is substantially the same as the number of the resonant inverters of the cathode voltage generator.

4. The high frequency X-ray generator of claim 2, wherein:
the high voltage tank comprises a plurality of high-voltage transformers and a high-voltage rectifier circuit;
the high-voltage transformer is connected to the multiple switching circuit in series and multiplies received voltage; and
the high-voltage rectifier circuit generates the first high voltage or the second high voltage by rectifying the voltage that has been multiplied by the high-voltage transformers.

5. The high frequency X-ray generator of claim 4, wherein:
each one of the high-voltage transformers comprises a core, the core has a first side and a second side, one first winding is wound at the first side, a plurality of second windings is wound at the second side, each of the high-voltage transformers is connected to the high-voltage rectifier circuit in a series;
the first winding receives the voltage from each of the resonant inverters of the multiple switching circuit; and
the second windings multiply the received voltage the first winding received as the number of the second windings.

6. The high frequency X-ray generator of claim 5, wherein the anode voltage generator or the cathode voltage generator further comprises a resonant circuit configured to transmit the voltage generated from the voltage generator to the high voltage tank.

7. The high frequency X-ray generator of claim 5, wherein the high-voltage rectifier circuit is connected to a plurality of the second sides of the high-voltage transformers in series, and generates the first high voltage or the second high voltage by summing a plurality of the multiplied voltages from the high-voltage transformers.

8. The high frequency X-ray generator of claim 1, wherein:
the feedback controller compares the first high voltage to a reference voltage when the feedback controller is included in the anode voltage generator, and the feedback controller compares the second high voltage to the reference voltage when the feedback controller is included in the cathode voltage generator; and
so that the feedback controller controls the multiple switching circuit, configured to modulate pulse width of the voltage, which is generated from the voltage generator of the anode voltage generator or the cathode voltage generator, based on the compared value.

9. The high frequency X-ray generator of claim 8, wherein:
the feedback controller comprises a PI controller and a PWM controller;
the PI controller calculates a difference value between the reference voltage and the first or second high voltage, and generates a control value based on the difference value; and
the PWM controller controls the multiple switching circuit configured to modulate the pulse width of the voltage, based on the control value.

10. The high frequency X-ray generator of claim 1, wherein the first and second high voltage tanks are disposed in a parallel-connected-type or serial-connected-type according to an arrangement of high-voltage transformers of each of the first and second high voltage tanks.

11. The high frequency X-ray generator of claim 10, further comprising an insulator configured to insulate a first high-voltage cable connecting a terminal from the first high voltage tank and configured to insulate a second high-voltage cable connecting a terminal from the second high voltage tank, wherein the first high-voltage cable connecting the terminal transmits the first high voltage, and the second high-voltage cable connecting the terminal transmits the second high voltage.

12. The high frequency X-ray generator of claim 11, wherein:
when the first and second high voltage tanks are disposed in the parallel-connected-type configuration, cores of the high-voltage transformers of the first high voltage tank and cores of the high-voltage transformers of the second high voltage tank are disposed in the same direction, and arranged in a perpendicular direction to the direction of the core; and
the insulator is further configured to insulate the first high voltage tank from the second high voltage tank.

13. The high frequency X-ray generator of claim 12, wherein the insulator has a T-shape.

14. The high frequency X-ray generator of claim 11, wherein:

when the first and second high voltage tanks are disposed in the serial-connected-type configuration, cores of the high-voltage transformers in the first high voltage tank and cores of the high-voltage transformers of the second high voltage tank are disposed in a same direction to each other;

the high-voltage transformer of the first high voltage tank and the high-voltage transformer of the second high voltage tank are disposed in a mirror symmetric configuration;

each of the high-voltage transformers in each of the high voltage tanks is disposed in a multi-layer structure, so that all of directions of second windings of the high-voltage transformers in each of the high voltage tanks are same each other; and a ground terminal is disposed between the first high voltage tank and the second high voltage tank.

15. The high frequency X-ray generator of claim 14, wherein the insulator has a I-shape to insulate the high-voltage cable connecting the terminal and the high voltage tank.

\* \* \* \* \*

UNITED STATES PATENT AND TRADEMARK OFFICE
CERTIFICATE OF CORRECTION

| | | |
|---|---|---|
| PATENT NO. | : 9,468,081 B2 | Page 1 of 1 |
| APPLICATION NO. | : 14/677385 | |
| DATED | : October 11, 2016 | |
| INVENTOR(S) | : Young Min Seo and Min Soo Byun | |

It is certified that error appears in the above-identified patent and that said Letters Patent is hereby corrected as shown below:

In the Specification

Column 1, Line 8, add:
-- GOVERNMENT RIGHTS IN INVENTION
This invention was made with Korean government support under Project No. 10045921 (Research Program: Advanced Technology Center Project) awarded by Ministry of Trade, Industry and Energy (Research management institution: Korea Evaluation Institute of Industrial Technology) for the Research subject of "Development of 250kHz/100kW Level Diagnostic X-ray Generator for X-ray Digital Fluoroscopy and Angiography", carried out by DRGEM Corp. The Korean government has certain rights in the invention. --

Signed and Sealed this
Third Day of October, 2017

Joseph Matal
*Performing the Functions and Duties of the*
*Under Secretary of Commerce for Intellectual Property and*
*Director of the United States Patent and Trademark Office*